(12) United States Patent
Yi

(10) Patent No.: US 9,141,221 B2
(45) Date of Patent: Sep. 22, 2015

(54) DISPLAY DEVICE AND INPUT DEVICE

(75) Inventor: Dae Kyu Yi, Suwon-si (KR)

(73) Assignee: LG DISPLAY CO., LTD., Seoul (KR)

( * ) Notice: Subject to any disclaimer, the term of this patent is extended or adjusted under 35 U.S.C. 154(b) by 681 days.

(21) Appl. No.: 12/937,106

(22) PCT Filed: Apr. 13, 2009

(86) PCT No.: PCT/KR2009/001876
§ 371 (c)(1),
(2), (4) Date: Oct. 8, 2010

(87) PCT Pub. No.: WO2009/126006
PCT Pub. Date: Oct. 15, 2009

(65) Prior Publication Data
US 2011/0025637 A1    Feb. 3, 2011

(30) Foreign Application Priority Data
Apr. 11, 2008  (KR) ........................ 10-2008-0033920

(51) Int. Cl.
*G06F 3/041* (2006.01)
*G09G 3/20* (2006.01)

(52) U.S. Cl.
CPC ................ *G06F 3/0412* (2013.01); *G09G 3/20* (2013.01); *G09G 2300/0814* (2013.01)

(58) Field of Classification Search
USPC ....................................................... 345/173
See application file for complete search history.

(56) References Cited

U.S. PATENT DOCUMENTS

| 8,081,167 B2 * | 12/2011 | Kim et al. ..................... 345/173 |
| 2006/0109222 A1 | 5/2006 | Lee et al. |
| 2006/0119718 A1 * | 6/2006 | Hur et al. ....................... 348/302 |
| 2006/0176285 A1 | 8/2006 | Lee et al. |
| 2007/0235803 A1 | 10/2007 | Shin et al. |
| 2008/0018612 A1 * | 1/2008 | Nakamura et al. ............ 345/173 |

FOREIGN PATENT DOCUMENTS

| JP | 2006-154815 A | 6/2006 |
| KR | 1999-0043700 A | 6/1999 |
| KR | 10-2006-0062830 A | 6/2006 |

* cited by examiner

*Primary Examiner* — Amr Awad
*Assistant Examiner* — Andre Matthews
(74) *Attorney, Agent, or Firm* — Birch, Stewart, Kolasch & Birch, LLP

(57) ABSTRACT

Disclosed are a display device and an input device. The display device includes: gate and data lines arranged to cross each other and to define a pixel region; a pixel electrode disposed on the pixel region; a sensing element disposed on the pixel region; and a switching element configured to selectively connect the data line with any one of the pixel electrode and sensing element. Such a display device according to an embodiment allows both of a scan signal for the display of an image and an externally input signal to be transferred through the data line. Therefore, the display device according to an embodiment can display an image and input an external signal such as a touch or others, using a simplified configuration.

14 Claims, 2 Drawing Sheets

DISPLAY DEVICE AND INPUT DEVICE

TECHNICAL FIELD

The present disclosure relates to a display device and an input device.

BACKGROUND ART

The development of information processing techniques makes flat display devices, such as liquid crystal display (LCD) devices, active matrix organic light emission diode (AMOLED) devices, plasma display panels (PDPs) and so on, to be widely distributed.

Moreover, touch screens suitable to directly input signals into the screens of the flat display devices are being widely used.

The touch screens can be disposed on the flat display devices. Alternatively, elements suitable for inputting signals generated by touching a screen can be included into the display devices.

DISCLOSURE

Technical Problem

Embodiments of the present description are to provide display and input devices which are adapted to display images and to simultaneously input signals from the exterior. More specifically, the embodiments of the present description are to provide display and input devices which are suitable to simplify a wiring structure for inputting signals sensed by sensing elements.

Technical Solution

A display device according to an embodiment of the present description includes: gate and data lines arranged to cross each other and to define a pixel region; a pixel electrode disposed on the pixel region; a sensing element disposed on the pixel region; and a switching element configured to selectively connect the data line with any one of the pixel electrode and sensing element.

The switch element includes: a first switch configured to perform any one of a connection and a disconnection between the pixel electrode and the data line; and a second switch configured to perform any one of a connection and a disconnection between the sensing element and the data line.

The display device according to an embodiment of the present description further includes a switching line disposed parallel to the data line. The switch includes: a first thin film transistor configured to be driven by a first switching signal on the gate line; and a second thin film transistor configured to be driven by a second switching signal on the switching signal line.

The second switch includes: a third thin film transistor configured to be driven by the first switching signal; and a fourth thin film transistor configured to be driven by a second switching signal.

The first thin film transistor may be a MOSFET (metal oxide semiconductor field effect transistor) of a first type and the second thin film transistor may be a MOSFET of a second type.

The third thin film transistor may be a MOSFET of a first type and the fourth thin film transistor may be a MOSFET of a second type.

The first and second switching signals include: a first time period used to turn-on all the first and second thin film transistors; and a second time period used to turn-on only one of the first and second thin film transistors.

The display device according to an embodiment of the present description can further include a bias line used to apply a bias voltage to the sensing element.

A display device according to another embodiment of the present description includes: a plurality of gate lines formed to extend along a first direction; a plurality of data lines formed to cross the gate lines; pixel electrodes arranged on pixel regions which are defined by the gate and data lines; sensing elements arranged in the pixel region and each configured to sense an external signal and to generate an electrically sensed signal; and a control unit configured to apply scan signals for the display of an image to the pixel electrodes through the data lines and to receive the electrically sensed signals through the data lines.

The display device according to another embodiment of the present description can further include: first switches each configured to be driven by first and second switching signals, which are applied from the control unit, and to perform any one of a connection and a disconnection between the respective pixel electrode and the respective data line; and second switches each configured to be driven by the first and second switching signals and to perform any one of a connection and a disconnection between the respective sensing element and the respective data line.

The control unit includes: a data driver configured to generate the scan signals;

a gate driver configured to generate the first switching signal; and a switching signal generator configured to generate the second switching signal.

The display device according to another embodiment of the present description can further include a plurality of switching signal lines arranged to transfer the second switching signal to the first switches and the second switches.

The switching signal lines are electrically connected to one another.

An input device according to an embodiment of the present description includes: gate and data lines arranged to cross each other and to define a pixel region; a pixel electrode disposed on the pixel region; a sensing element disposed on the pixel region and configured to convert an external signal into an electrically sensed signal; and a switching element configured to selectively connect the data line with any one of the pixel electrode and sensing element.

The input device according to an embodiment of the present description can further include a control unit configured to apply a scan signal for the display of an image to the pixel electrode through the data line and to receive the electrically sensed signal through the data line.

Advantageous Effects

Such a display device according to an embodiment of the present description can differently drive the first and second switches using switching signals.

As such, the sensed signal can be applied to the system via the data line while the pixel voltage signal is not applied to the pixel electrode via the data line.

In other words, the display device allows the pixel electrode and the sensing element to commonly use the data line. Therefore, it is unnecessary to additionally form read-out lines for transferring the sensed signals.

BEST MODE

Figure 1:
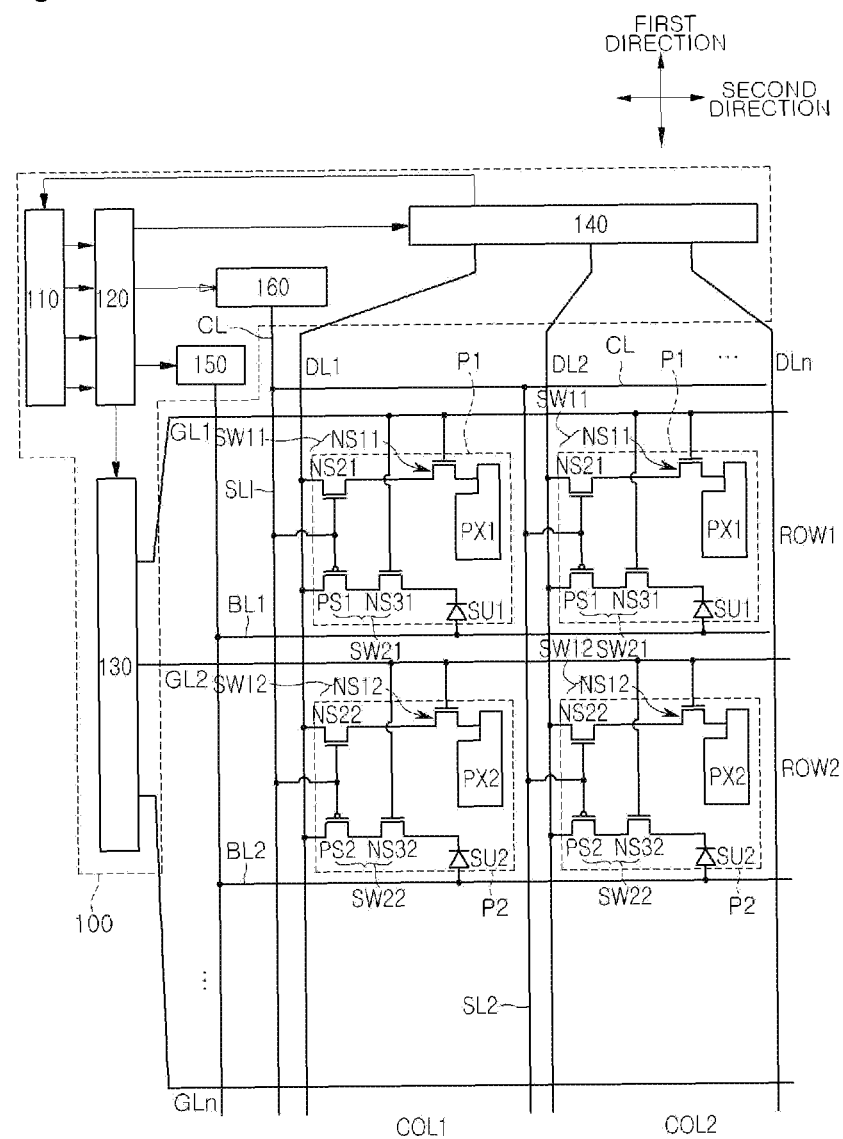
FIG. 1 is a configuration diagram for a display device according to an embodiment of the present description.
Figure 2:
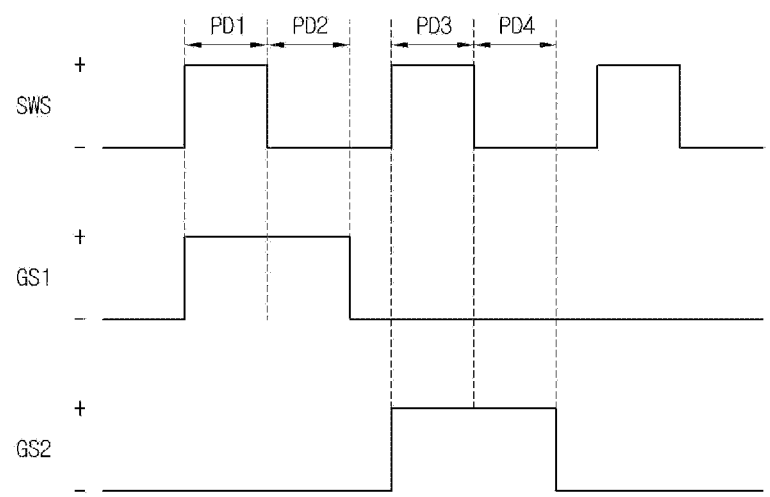
FIG. 2 is a waveform diagram showing the waveforms of switching signals.

FIG. 1 is a configuration diagram for a display device according to an embodiment of the present description. FIG. 2 is a waveform diagram showing the waveforms of switching signals.

Referring to FIGS. 1 and 2, the display device includes gate lines "GL1, GL2, . . . " (hereinafter, GLs), data lines "DL1, DL2, . . . " (hereinafter, DLs), switching signal lines "SL1, SL2, . . . " (hereinafter, SLs), and bias lines "BL1, BL2, . . . " (hereinafter, BLs). The display device further includes switching elements, pixel electrodes "PX1, PX2, . . . " (hereinafter, PXs), sensing elements "SU1, SU2, . . . " (hereinafter, SUs), and a control unit 100.

The gate lines GLs are arranged to extend in a first direction. The gate lines GLs are electrically connected to the control unit 100. Such gate lines GLs receive gate signals from the control unit 100 and apply the received gate signals to the switching elements The data lines DLs are arranged to extend in a second direction. The data lines DLs are arranged to cross the gate lines GLs. As such, a plurality of pixel regions "P1, P2, . . . " (hereinafter, Ps) are defined by the gate lines GLs and the data lines DLs.

The data lines DLs are electrically connected to the control unit 100. The data lines DLs receive scan signals from the control unit 100.

The switching signal lines SLs are arranged to extend in the second direction. The switching signal lines SLs are arranged parallel to the data lines DLs.

The switching signal lines SLs arranged parallel to the data lines DLs are provided with the same number of the data lines DLs.

Alternatively, the switching signal lines SLs can be arranged by ones per two data lines. In another different way, the switching signal lines SLs can be placed by ones per three data lines.

The switching signal lines SLs are electrically connected to the control unit 100 by means of a connection line CL. In other words, the switching signal lines SLs are electrically connected with one another. As such, the control unit 100 commonly applies a switching signal SWS to the switching signal lines SLs.

Moreover, the switching signal lines SLs receive the switch signal SWS from the control unit 100. The switching signal lines SLs apply the received switching signal SWS to the switching elements.

The bias lines BLs are arranged along the first direction. The bias lines BLs are arranged parallel to the gate lines GLs.

The bias lines BLs are provided with the same number as the gate lines GLs.

Alternatively, the bias line BLs can be arranged by ones per two gate lines. In another different way, the bias lines BLs can be placed by ones per three gate lines.

The bias lines BLs are electrically connected to the control unit 100. As such, the bias lines BLs receive a bias voltage from the control unit 100 and apply the received bias voltage to the sensing elements SUs.

The switching elements are arranged in the pixel regions Ps, respectively. Each of the switching elements selectively connects the respective data line DL with the respective pixel electrode PX or the respective sensing elements SU.

Actually, the switching elements can connect the data lines DLs with the pixel electrodes PXs. In this case, the sensing elements SUs are disconnected from the data lines DLs by means of the switching elements.

On the contrary, the switching elements can disconnect the pixel electrodes PXs from the data lines DLs. At this time, the sensing elements SUs are connected to the data lines DLs by means of the switching elements.

For example, the operation of a single switching element SW11 and SW21 within a first pixel P1 will be described. The switching element SW11 and SW21 is driven in response to the signals on gate and switch signal lines GL1 and SL1. When the switching element SW11 and SW21 connects a pixel electrode PX1 with a data line DL1, a sensing element SU1 is disconnected from the data line DL1 by the switching element SW11 and SW21. On the contrary, the switching element SW11 and SW21 connects the sensing element SU1 with the data line DL1 when the pixel electrode PX1 is disconnected from the data line DL1 by the switching element SW11 and SW21.

The switching elements each have a first switch "SW11, SW12, . . . " (hereinafter, SW1s) and a second switch "SW21, SW22, . . . " (hereinafter, SW2s).

The first switches SW1s and the second switches SW2s are driven by the signals which are applied from the control unit 100 via one side of the gate lines GLs and switching signal lines SLs.

Also, the first switches SW1s and the second switches SW2s are driven inversely to each other. In other words, the first switches SW1s and the second switches SW2s are driven exclusively with each other. Actually, when the first switches SW1s are turned-on, the second switches SW2s are turned-off. On the contrary, the first switches SW are turned-off when the second switches SW2s are turned-on.

The first switches SW1s are arranged within the pixel regions Ps, respectively. Each of the first switches SW1s selectively performs the electrical connection between the respective data line DL with the respective pixel electrode PXs.

Now, a first switch SW11 disposed within a pixel region P1 will be explained in detail. The first switch SW11 selectively performs the electrical connection between a data line DL1 and a pixel electrode PX1.

Also, the first switch SW11 is connected to the data line DL1 and the pixel electrode PX1.

Furthermore, the first switch SW11 is driven by a first gate signal GS1 and the switching signal SWS. More specifically, the first switch SW11 is turned-on or turned-off by the first gate signal GS1 and the switching signal SWS. Consequently, the data line DL1 is electrically connected to or disconnected from the pixel electrode PX1 by the first gate signal GS1 and the switching signal SWS.

Such a first switch SW11 includes a first n-type metal oxide semiconductor field effect transistor (n-MOSFET) NS11 and a second n-MOSFET NS21.

The first n-MOSFET NS11 is turned-on or turned-off in response to the first gate signal GS1.

The second n-MOSFET is turned-on or turned-off in response to the switching signal SWS.

Also, the first n-MOSFET NS11 and the second n-MOSFET NS21 are serially connected with each other.

In accordance therewith, the data line DL1 is electrically connected to the pixel electrode PX1 when all the first and second n-MOSFETs NS11 and NS21 are turned-on.

The second switches SW2s are arranged within the pixel regions Ps, respectively. In other words, the second switches SW2s may be arranged by ones per one pixel region P. Alternatively, the second switches SW2s can be placed by ones per two pixel regions Ps. In another different manner, the second switches SW2s can be provided by ones per three pixel regions Ps.

Each of the second switches SW2s selectively performs the electrical connection between the respective data line DL and the respective sensing element SU.

The explanation for a second switch SW21 disposed with a first pixel region P1 will now be made in detail.

The second switch SW21 is electrically connected to the data line DL1 and a sensing element SU1. The electrical connection between the data line DL1 and the sensing element SU1 is selectively performed.

The second switch SW21 is driven by the first gate signal GS1 and the switching signal SWS. More specifically, the second switch SW21 is turned-on or turned-off by the first gate signal GS1 and the switching signal SWS. Consequently, the data line DL1 is electrically connected to or disconnected from the sensing element SU1 by the first gate signal GS1 and the switching signal SWS.

The second switch SW21 includes a third n-MOSFET NS31 and a p-MOSFET PS1.

The third n-MOSFET NS31 is turned-on or turned-off in response to the first gate signal GS1.

The p-MOSFET PS1 is turned-on or turned-off in response to the switching signal SWS. The p-MOSFET PS1 has an electrical characteristic opposite to those of the first through third n-MOSFETs NS11 through NS31.

For example, if a positive polarity voltage (+) is applied to the first through third n-MOSFETs NS11 through NS31 and the p-MOSFET PS1, the first through third n-MOSFETs NS11 through NS31 are turned-on, but the p-MOSFET PS1 is turned-off.

On the contrary, when a negative polarity voltage (-) is applied to the first through third n-MOSFETs NS11 through NS31 and the p-MOSFET PS1, the first through third n-MOSFETs NS11 through NS31 are turned-off, but the p-MOSFET PS1 is turned-on.

The positive and negative polarity voltages (+) and (-) have electric potentials relative to each other. The positive polarity voltage (+) has a higher electric potential than that of the negative polarity voltage (-).

The third n-MOSFET NS31 and the p-MOSFET PS1 are serially connected with each other.

In accordance therewith, the sensing element SU1 and the data line DL1 are electrically connected with each other when the p-MOSFET PS1 and third n-MOSFET NS31 are turned-on.

The second n-MOSFET NS21 and the p-MOSFET PS1 are driven by the switching signal SWS. However, the second n-MOSFET NS21 and the p-MOSFET PS1 are driven inversely to each other.

Actually, when the second n-MOSFET NS21 is turned-on by a switching signal, the p-MOSFET PS1 is turned-off by the same switching signal.

Also, the first n-MOSFET NS11 and the third n-MOSFET NS31 are driven by the first gate signal GS1. As such, the first n-MOSFET NS11 and the third n-MOSFET NS31 are driven in the same manner as each other.

In other words, the first n-MOSFET NS11 and the third n-MOSFET NS31 are simultaneously turned-on or turned-off.

In a different manner, it is possible that the first switch SW11 includes two MOSFETs with different conductivity types from each other and the second switch SW21 includes two MOSFETs with the same conductivity type as each other.

The pixel electrodes PXs are arranged by ones in each of the pixel regions Ps.

The pixel electrodes PXs receive the scan signals via the data lines DLs, respectively. The scan signals induce electrical fields to be formed between the pixel electrodes PXs and a common electrode. An image can be displayed by the electric fields.

The sensing elements SUs are arranged in the pixel regions Ps, respectively. More specifically, the sensing elements SUs are arranged by ones in each of the pixel regions Ps where the second switches SW2s are respectively placed.

The sensing elements SUs are configured to each sense a touch or light input signal from the exterior. As an example of the sensing element, any one of a photo diode, a photo thin film transistor and so on can be used.

The sensing elements SUs are electrically connected to the bias lines BLs. Also, the sensing elements SUs are connected to the second switches SW2s, respectively.

Each of the sensing elements SUs generates a sensed signal corresponding to the input signal from the exterior. More specifically, a touch or light signal is applied to any one of the sensing elements SUs, the sensing element SU enables an electric current to flow from the respective bias line BL into a system 110 via the respective data line DL.

The control unit 100 is electrically connected with the gate lines GLs, the data lines DLs, the bias lines BLs, and the switching signal lines SLs. The control unit 100 generates the gate signals GSs, the scan signals, the bias voltage, and the switching signal SWS.

Such a control unit 100 includes the system 110, a timing controller 120, a gate driver 130, data driver 140, a bias signal generator 150, and a switching signal generator 160.

The system 110 applies RGB data and first control signals to the timing controller 120. The first control signals include an input clock, a horizontal synchronous signal, a vertical synchronous signal, and a data enable signal DE.

The timing controller 120 generates second through fifth control signals on the basis of the RGB data and first control signals. The second through fifth control signals are applied to the gate driver 130, the data driver 140, the bias voltage generator 150, and the switching signal generator 160, respectively.

The gate driver 130 derives the gate signals GSs from the second control signal. The gate signals GSs are applied to the gate lines GLs, respectively.

The second control signal may include a gate shift clock GSC, a gate output enable signal GOE, and a gate start pulse GSP.

The data driver 140 derives the scan signals from the third control signal. The scan signals are applied to the data lines DLs, respectively.

The third control signal may include a source sampling clock SSC, a source output enable signal SOE, a source start pulse SSP, a polarity reverse signal POL, a data reverse signal, and odd/even data.

The bias voltage generator 150 derives the bias voltage from the fourth control signal. The bias voltage is applied to the sensing elements SUs via the bias lines BLs. This bias voltage may be a direct voltage maintaining a fixed level.

Alternatively, the bias voltage can become a voltage signal having a level which varies at every fixed time interval.

The switching signal generator 160 derives the switching signal SWS from the fifth control signal. The switching signal SWS is applied to the connection line CL and the switching signal lines SLs. Also, the switching signal SWS is used for driving the first switches SW1s and the second switches SW2s.

A process of inputting a signal to the display device according to an embodiment of the present description will now be explained.

Referring to FIG. 2, the switching signal SWS includes pulses synchronized with pulsed of the gate signals GSs.

More specifically, the switching signal SWS has a positive polarity voltage (+) during a first time period PD1. At the same time, the first gate signal GS1 also has the positive polarity voltage (+).

The switching signal SWS has a negative polarity voltage (−) but the first gate signal GS1 maintains the positive polarity voltage (+), in a second time period PD2.

The switching signal SWS and the second gate signal GS2 all have the positive polarity voltage (+) during a third time period PD3.

In a fourth time period, the switching signal SWS has the negative polarity voltage (−), but the second gate signal GS2 maintains the positive polarity voltage (+).

The second n-MOSFETs NS21 of a first row ROW1 are turned-on by the switching signal SWS during the first time period PD1. On the other hand, the p-MOSFETs PS1 of a first row ROW1 are turned-off by the switching signal SWS for the same time period.

Also, the first n-MOSFETs NS11 of the first row ROW1 and the third n-MOSFETs of the first row ROW1 are turned-on by the first gate signal GS1 during the first time period PD1.

Consequently, the first switches SW11 of the first row ROW1 are turned-on but the second switches SW21 of the first row ROW1 are turned-off, during the first time period PD1.

As such, the pixel electrodes PX1 of the first row ROW1 are electrically connected to the respective data lines DLs for the first time period PD1. On the other hand, the sensing elements SU1 of the first row ROW1 are electrically disconnected from the respective data lines DLs for the first time period PD1.

Therefore, the scan signals on the data lines DLs are applied to the pixel electrodes PX1 of the first row ROW1. The scan signals enable an image to be displayed on the pixel regions P1 of the first row ROW1.

During the second time period PD2, the second n-MOSFETs NS21 of the first row ROW1 are turned-off by the switching signal SWS. On the other hand, the p-MOSFETs PS1 of the first row ROW1 are turned-on by the switching signal SWS at the same time period.

Also, all the first n-MOSFETs NS11 and third n-MOSFETs NS31 in the first row ROW1 maintain the turned-on state by the first gate signal GS1 during the second time period PD2.

In other words, the first switches SW11 in the first row ROW1 are turned-off, but the second switches SW21 in the first row ROW1 are turned-on, during the second time period PD2.

As such, the pixel electrodes PX1 in the first row ROW1 are electrically disconnected from the respective data lines DLs during the second time period PD2. The sensing elements SU1 in the first row ROW1 are connected to the respective data lines DLs for the same time period.

Therefore, the sensed signals generated in the sensing elements SU1 of the first row ROW1 can be applied to the system 110 via the respective data lines DLs during the second time period PD2.

The pixel electrodes PX2 in a second row ROW2 are electrically connected to the respective data lines DLs during the third time period PD3. Meanwhile, the sensing elements SU2 in the second row ROW2 are electrically disconnected from the respective data lines DLs for the same time period.

As such, the scan signals are applied to the respective pixel electrodes PX2 of the second row ROW2 via the respective data lines DLs during the third time period PD3. The scan signals forces an image to be displayed on the pixel regions P2 of the second row ROW2.

During the fourth time period PD4, the pixel electrodes PX2 in the second row ROW2 are electrically disconnected from the respective data lines DLs. On the other hand, the sensing elements SU2 are electrically connected to the respective data line DLs for the same time period.

Therefore, the sensed signals generated in the sensing elements SU2 of the second row ROW2 can be applied to the system 110 via the respective data lines DLs.

In this manner, the image is displayed on the pixel regions Ps which are sequentially driven by a single row for the odd numbered time periods PD1, PD3, and so on (hereinafter, PDos). Also, the sensed signals can be sequentially applied by a single row to the system 110 for the even numbered time periods PD2, PD4, and so on (hereinafter, PDes). For the convenience of explanation, "ROW1, ROW, . . ." and "COL1, COL2, . . . " will be referred to as "ROWs" and "COLs", respectively.

The system 110 analyzes any one of the time periods PDs for and any one of the data lines DLs from which the sensed signal is input. Also, the system 110 can calculates a touched position of the display device on the basis of the analyzed resultant.

Actually, the even-numbered time periods PDes are established opposite the rows ROWs of the display device, respectively. As such, if a sensed signal is input during the second time period PD2, the sensed signal indicates means that an external signal such as a touch or others is input through the first row ROW1 of the display device.

Also, the data lines DLs correspond to columns COLs of the display device, respectively. As such, when a sensed signal is applied from the first data line DL1 to the system 110, the sensed signal indicates that an external signal, such as a touch or other, is input through the first column COL1 of the display device.

Consequently, the system 110 detects row and column coordinates on the screen of the display screen by analyzing the time period for and the data lines from which the sensed signals are input.

Such a display device according to an embodiment of the present description commonly uses the data lines DLs not only to display an image but also to input the sensed signals.

As such, it is unnecessary to additionally form read-out lines for transferring the sensed signals. Therefore, the display device according to an embodiment of the present description can be simply configured.

Moreover, the display device according to an embodiment of the present description includes only one connection line CL used to connect the control unit 100 with the switching signal lines SLs.

Although embodiments have been described with reference to a number of illustrative embodiments thereof, this disclosure is not limited to those. In other words, this disclosure is presented as an example. Also, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. Therefore, variations and

The invention claimed is:

1. A display device comprising:
   gate and data lines arranged to cross each other and to define a pixel region;
   a pixel electrode disposed on the pixel region;
   a sensing element disposed on the pixel region;
   a switching element configured to selectively connect a respective data line with any one of the pixel electrode and sensing element,
   wherein the switch element includes:
      a first switch configured to perform any one of a connection and a disconnection between the pixel electrode and the respective data line, and
      a second switch configured to perform any one of a connection and a disconnection between the sensing element and the respective data line; and
   a switching signal line disposed parallel to the respective data line,
   wherein the first switch includes:
      a first thin film transistor configured to be driven by a first switching signal supplied from a respective gate line, and
      a second thin film transistor configured to be driven by a second switching signal supplied from the switching signal line, and
   wherein the second switch includes:
      a third thin film transistor configured to be driven by the first switching signal supplied from the respective gate line, and
      a fourth thin film transistor configured to be driven by the second switching signal supplied from the switching signal line, and
      wherein the second thin film transistor and the fourth thin film transistor are opposite polarity types of transistors to each other so that when either of the second and fourth thin film transistors is turned on, the other is turned off.

2. The display device of claim 1, wherein the first thin film transistor is a MOSFET (metal oxide semiconductor field effect transistor) of a first type and the second thin film transistor is a MOSFET of a second type.

3. The display device of claim 1, wherein the third thin film transistor is a MOSFET (metal oxide semiconductor field effect transistor) of a first type and the fourth thin film transistor is a MOSFET of a second type.

4. The display device of claim 1, wherein the first and second switching signals include:
   a first time period used to turn-on all the first and second thin film. transistors; and
   a second time period used to turn-on only one of the first and second thin film transistors.

5. The display device of claim 1, further comprising a bias line used to apply a bias voltage to the sensing element.

6. The display device of claim 1, wherein the first thin film transistor and the third thin film transistor are connected in common to the respective gate line, and the second thin film transistor and the fourth thin film transistor are connected in common to the switching signal line.

7. A display device comprising:
   a plurality of gate lines formed to extend along a first direction;
   a plurality of data lines formed to cross the gate lines;
   pixel electrodes arranged on pixel regions which are defined by the gate and data lines;
   sensing elements arranged in the pixel region and each configured to sense an external signal and generate an electrically sensed signal;
   a control unit configured to apply scan signals for the display of an image to the pixel electrodes through the data lines and receive the electrically sensed signals through the data lines;
   a first switch configured to be driven by first and second switching signals, which are applied front the control unit, and perform any one of a connection and a disconnection between the respective pixel electrode and a respective data line;
   a second switch configured to be driven by the first and second switching signals, and perform any one of a connection and a disconnection between the respective sensing element and the respective data line; and
   a switching signal line disposed parallel to the respective data line,
   wherein the first switch includes:
      a first thin film transistor configured to be driven by the first switching signal supplied from a respective gate line, and
      a second thin film transistor configured to be driven by the second switching signal supplied from the switching signal line, and
   wherein the second switch includes:
      a third thin film transistor configured to be driven by the first switching signal supplied from the respective gate line, and
      a fourth thin film transistor configured to be driven by the second switching signal supplied from the switching signa1 line, and
      wherein the second thin film transistor and the fourth thin film transistor are opposite polarity types of transistors to each other so that when either of the second and fourth thin film transistors is turned on, the other is turned off.

8. The display device of claim 7, wherein the control unit includes:
   a data driver configured to generate the scan signals;
   a gate driver configured to generate the first switching signal; and
   a switching signal generator configured to generate the second switching signal.

9. The display device of claim 7, further comprising:
   a plurality of switching signal lines arranged to transfer the second switching signal to the first switches and the second switches.

10. The display device claimed as claim 9, wherein the switching signal lines are electrically connected to one another.

11. The display device of claim 7, wherein the first thin film transistor and the third thin film transistor are connected in common to the respective gate line, and the second thin film transistor and the fourth thin film transistor are connected in common to the switching signal line.

12. An input device comprising:
   gate and data lines arranged to cross each other and to define a pixel region;
   a pixel electrode disposed on the pixel region;

a sensing element disposed on the pixel region and configured to convert an external signal into an electrically sensed signal;

a switch element configured to selectively connect a respective data line with any one of the pixel electrode and sensing element, wherein the switch element includes:
- a first switch configured to perform any one of a connection and a disconnection between the pixel electrode and the respective data line, and
- a second switch configured to perform any one of a connection and a disconnection between the sensing element and the respective data line; and a switching signal line disposed parallel to the respective data line, wherein the first switch includes:
- a first thin film transistor configured to be driven by a first switching signal supplied from a respective gate line, and
- a second thin film transistor configured to be driven by a second switching signal supplied from the switching signal line, and wherein the second switch includes:
- a third thin film. transistor configured to be driven by the first switching signal supplied from the respective gate line, and
- a fourth thin film transistor configured to he driven by the second switching signal supplied from the switching signal line, and
- wherein the second thin film transistor and the fourth thin film transistor are opposite polarity types of transistors to each other so that when either of the second and fourth thin film transistors is turned on, the other is turned off.

13. The input device of claim 12, further comprising a control unit configured to apply a scan signal for the display of an image to the pixel electrode through the respective data line and receive the electrically sensed signal through the respective data line.

14. The input device of claim 12, wherein the first thin film transistor and the third thin film transistor are connected in common to the respective gate line, and the second thin film transistor and the fourth thin film transistor are connected in common to the switching signal line.

* * * * *